(12) United States Patent
Tiwari et al.

(10) Patent No.: US 11,734,012 B2
(45) Date of Patent: Aug. 22, 2023

(54) SYSTEMS AND METHODS FOR EFFICIENT TRANSFER OF LOG DATA

(71) Applicant: BMC Software, Inc., Houston, TX (US)

(72) Inventors: Rakesh Tiwari, Pune (IN); Dasari Subramanyeswara Rao, Bangalore (IN); Jatinkumar Jayantkumar Parikh, Pune (IN)

(73) Assignee: BMC Software, Inc., Houston, TX (US)

( * ) Notice: Subject to any disclaimer, the term of this patent is extended or adjusted under 35 U.S.C. 154(b) by 268 days.

(21) Appl. No.: 17/301,377

(22) Filed: Mar. 31, 2021

(65) Prior Publication Data

US 2022/0318019 A1 Oct. 6, 2022

(51) Int. Cl.
*G06F 9/38* (2018.01)
*G06F 16/17* (2019.01)
*H04L 9/32* (2006.01)
*G06F 9/30* (2018.01)

(52) U.S. Cl.
CPC ........ *G06F 9/3836* (2013.01); *G06F 9/30145* (2013.01); *G06F 16/1734* (2019.01); *H04L 9/3247* (2013.01)

(58) Field of Classification Search
CPC ............... G06F 9/3836; G06F 9/30145; G06F 16/1734; G06F 11/3476; G06F 2201/83; G06F 17/40; H04L 9/3247
See application file for complete search history.

(56) References Cited

U.S. PATENT DOCUMENTS

| 5,822,513 | A | * | 10/1998 | Ofer | G11B 20/182 714/42 |
| 7,546,427 | B2 | | 6/2009 | Gladwin et al. | |
| 8,234,256 | B2 | | 7/2012 | Destefano et al. | |
| 8,477,635 | B2 | * | 7/2013 | Sebastian | H04L 47/70 370/312 |

(Continued)

OTHER PUBLICATIONS

Kent et al.: "Guide to Computer Security Log Management: Recommendations of the National Institute of Standards and Technology," NIST, Special Publication 800-92, Sep. 2006, 72 pages.

(Continued)

*Primary Examiner* — Farley Abad
(74) *Attorney, Agent, or Firm* — Brake Hughes Bellermann LLP

(57) ABSTRACT

According to one general aspect, a non-transitory computer readable medium includes instructions that, when executed by at least one processor, cause a computing device to read a string of a log file for an application, where the log file comprises multiple strings of log data, compare the string to signatures stored in a memory to find a matching signature, where each of the signatures is encoded with a signature identifier (ID), determine a deviation between the string and the matching signature, encode the string with the signature identifier (ID) of the matching signature and the deviation, and transfer the string to a destination computing device using the signature identifier (ID) of the matching signature, the deviation, and a timestamp of the string.

21 Claims, 14 Drawing Sheets

(56) References Cited

U.S. PATENT DOCUMENTS

| | | | |
|---|---|---|---|
| 9,031,916 B2* | 5/2015 | Huang | G06F 21/552 |
| | | | 707/672 |
| 9,501,365 B2 | 11/2016 | Parab | |
| 9,552,305 B2 | 1/2017 | Volvovski et al. | |
| 9,935,652 B1* | 4/2018 | Chalmer | H03M 7/3079 |
| 10,681,157 B2* | 6/2020 | Bent | H04L 67/535 |
| 2003/0217281 A1* | 11/2003 | Ryan | G06F 21/6227 |
| | | | 726/28 |
| 2009/0328218 A1* | 12/2009 | Tsurukawa | H04L 9/3247 |
| | | | 711/216 |
| 2016/0342453 A1* | 11/2016 | Khan | G06F 11/0793 |
| 2018/0191850 A1* | 7/2018 | Tapse | H04L 67/535 |

OTHER PUBLICATIONS

Lee et al.: "The Unified Logging Inastructure for Data Analytics at Twitter," Proceedings of the VLDB Endowment, vol. 5, No. 12, Aug. 21, 2012, pp. 1771-1780.
Huffman, D.: "A Method for the Construction of Minimum-Redundancy Codes", Proceedings of the IRE. 40 (9): 1098-1101, 1952.

* cited by examiner

SYSTEMS AND METHODS FOR EFFICIENT TRANSFER OF LOG DATA

TECHNICAL FIELD

This description relates to systems and techniques for the efficient transfer of log data.

BACKGROUND

Data analytics tools analyze large amounts of data from different data sources such as, for example, application logs (also referred to as application log files). In general, application logs are collected and transferred over a network to a server for analysis by the data analytics tools. In many situations, the application log sizes are very large, which when transferred over the network to the server utilize a large network bandwidth and cause data lag among other technical problems. In some situations when debug or trace is enabled on an application, the application log size grows exponentially, which in turns increases the technical problems experienced across the network. To solve the technical problems encountered with the transfer of log data across a network, a technical solution is needed to reduce the network bandwidth usage, to reduce the data lag, and to increase the speed and efficiency for transferring the log data.

SUMMARY

According to one general aspect, a non-transitory computer readable medium includes instructions that, when executed by at least one processor, cause a computing device to read a string of a log file for an application, where the log file comprises multiple strings of log data, to compare the string to signatures stored in a memory to find a matching signature, where each of the signatures is encoded with a signature identifier (ID), to determine a deviation between the string and the matching signature, to encode the string with a signature identifier (ID) of the matching signature and the deviation, and to transfer the string to a destination computing device using the signature identifier (ID) of the matching signature, the deviation, and a timestamp of the string.

The details of one or more implementations are set forth in the accompanying drawings and the description below. Other features will be apparent from the description and drawings, and from the claims.

DETAILED DESCRIPTION

Figure 1:
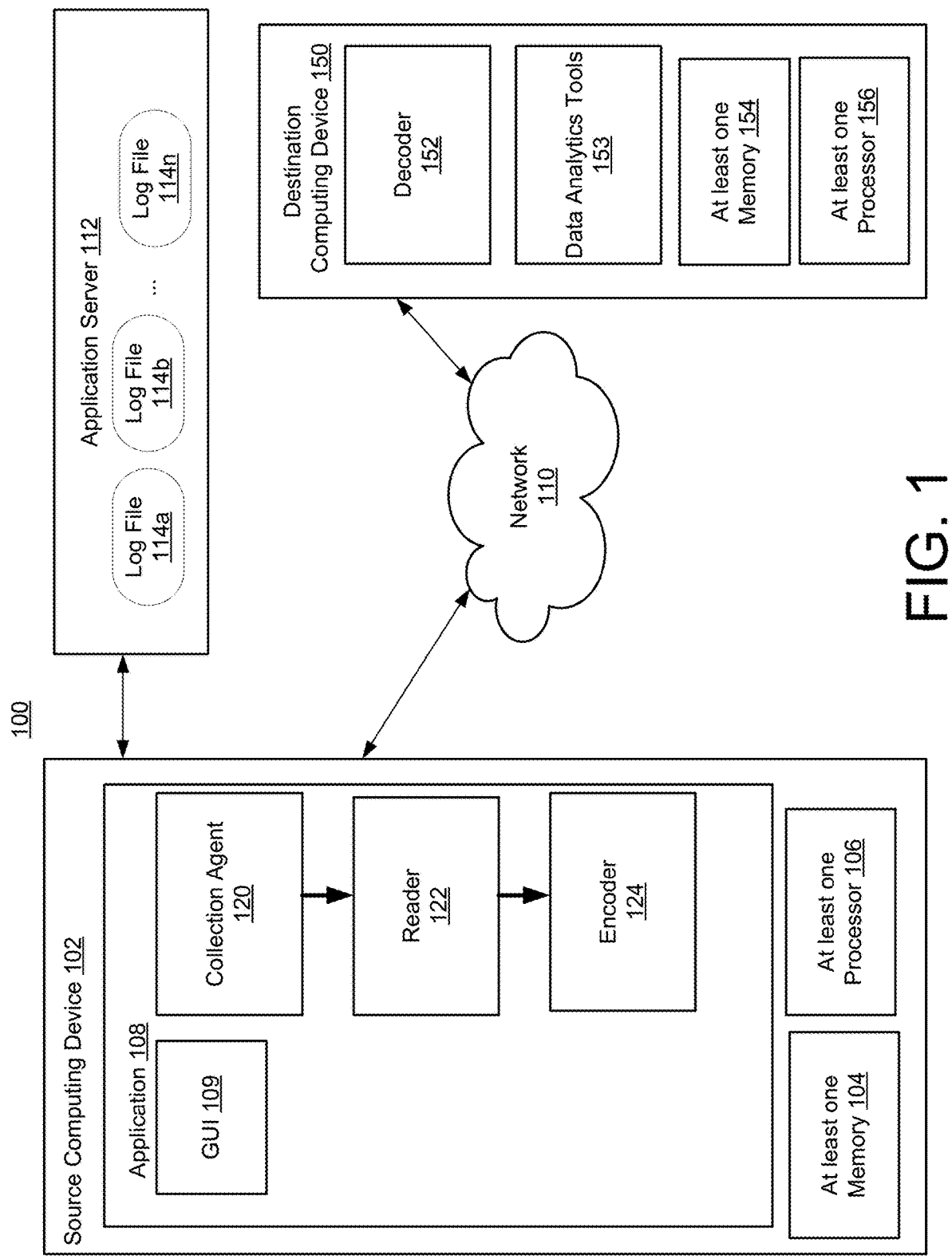
FIG. 1 is a block diagram of a system for collecting and transferring log data.

This document describes systems and techniques for the efficient transfer of data from a source to a destination (e.g., from a source computing device to a destination computing device). The systems and techniques address technical problems such as increased network bandwidth usage, data lag, indexing lag, and other technical problems identified above related to transfer of large amounts of data from a source to a destination over a network. The systems and techniques provide technical solutions to minimize or reduce the amount of data transferred from a source to a destination and technical solutions to fully reconstruct the original data at a destination. The technical solutions use an encoding mechanism to reduce a size of the payload data for a data transfer from a source to a destination. The encoding mechanism results in a reduced-size payload that may then be further compressed using a compression algorithm. By applying an encoding mechanism to reduce the size of a payload, a better compression ratio or greater reduction in an amount of data is achieved when a compression algorithm is used. In this manner, technical solutions achieve a reduction in the amount of data transferred over a network, yet still enable a full set of data to be reconstructed at a destination, and reduce or eliminate one or more technical problems. The technical solutions result in improved log data transfer that uses less network bandwidth (i.e., reduces network bandwidth utilization), reduces and/or avoids data lag and indexing lag, and achieves greater speed and efficiency for transferring data from the source to a destination across the network.

More specifically, the encoding mechanism is configured to perform a process to reduce a payload size of log data before it is optionally compressed and then transferred to a destination computing device. The encoding mechanism determines whether data strings in a log file match signatures (or signature strings) stored in memory. A match between a string in a log file and a stored signature may occur when a threshold amount of the string matches a stored signature. The threshold amount may be configurable, including configurable by a user, in order to achieve a desired minimization of the number of characters in the file being transmitted. For example, in some implementations, a match occurs when a string matches approximately 80% of a stored signature. Each of the signatures stored in a memory are encoded with a unique signature identifier (ID) that uniquely identifies a signature.

If a string in the log file does not match any of the signatures stored in a memory, it acts as a seed signature, a string is marked as a signature itself, and the string is encoded with a signature identifier (ID) such that other strings in the log file may be compared against it. The signatures stored in a memory are only transferred once to a destination computing device and are not stored in a memory more than once.

If a string in a log file does match one of the signatures stored in a memory and that match meets a threshold match, the string is encoded with the signature identifier (ID) of the matching signature. In this case, the entirety of the string is not transferred, and only the signature identifier (ID) and any portion of the string that deviates from the signature, which is a deviation, is transferred in a message to a destination computing device. In this manner, only a non-repetitive portion of a string is transferred to a destination computing device, and the repetitive part is replaced with a simple signature identifier (ID). The process, described in more detail below and performed by one or more components of an application and a source computing device 102, illustrates a general overview of the manner in which a repetitive portion of strings is identified and compared against signatures stored in memory and a non-repetitive portion of strings is encoded and transferred to a destination computing device.

As used herein, an application log (or application log file or log file) is a file of events that are logged by a software application. These events are logged or recorded by a software application and written to an application log file. The application log file may contain errors, informational events, warnings, transactional information, and other information.

As used herein, a string of log data refers to a line of data or a row of data in an application log file.

As used herein, a signature for a string of data is used to identify a string in a log file. The signature also may be referred to as a seed. A signature may be used to identify other strings in a log that are duplicative of itself. All signatures are coded with a unique signature identifier (ID).

A repetitive portion of a string is a portion of a string that matches at least in a configured threshold amount of a string that has been stored as a signature or seed in memory. A non-repetitive portion of a string is a portion of a string that does not match a corresponding portion of a signature and is therefore a deviation. A deviation is a portion of a string that does not match a portion of a signature at a corresponding location in the signature.

FIG. 1 is a block diagram of a system 100 for collecting and transferring log data from a source computing device 102 to a destination computing device 150 across a network 110. The system 100 collects log files and prepares the log files for transfer over the network 110. The system 100 reduces the amount of log data from the log file that is transferred over the network 110 by encoding the log data in a manner that reduces the payload size of the information transferred over the network. The system 100 encodes the log data prior to applying any optional compression algorithm to the log data. After the transfer of the log data over the network 110, the system 100 fully reconstructs the reduced payload of the log data by decoding the log data into the full log file for use by data analytics or other tools. In this manner, the system 100 advantageously reduces the network bandwidth utilization and increases the speed and efficiency of log data transfers over the network 110 while still achieving a fully reconstructed log file after the transfer.

The system 100 includes the source computing device 102, the destination computing device 150, and the network 110. The system 100 also includes at least one application server 112 on which one or more applications run. The application server may be a separate computing device from the source computing device 102, as illustrated in FIG. 1, or the source computing device 102 may function as the application server 112. That is, the source computing device 102 and the application server 112 may be integrated as part of the same computing device. In some implementations, the source computing device 102 and the application server 112 may both be either an on-premise device (meaning that the devise and the applications running on the device are on the premises of the person or organization using the device and applications) or at a remote facility such as in a server farm or on a cloud. In such cases, the source computing device 102 and the application server 112 may communicate through a local network (not shown) or other local communications means. In some implementations, the source computing device 102 and the application server 112 may be implemented as a Software as a Service (SaaS) implementation as part of a cloud-based service.

The application server 112 is a computing platform on which the applications run. As mentioned above, the application server 112 may be a separate computing device or may be part of the source computing device 102. Each of the applications may generate a log file 114a through 114n, which may be a file that contains data about events that have occurred within the application. The events are logged by the application and written to the log file 114a through 114n. In some implementations, the log files 114a through 114n may be domain controller log files. In many cases, it is desirable to index and analyze the log file for various reasons. One application server 112 may include multiple applications that each generate a respective log file 114a through 114n. In some cases, one application server 112 may include a single application that generates multiple log files 114a through 114n. While only one application server 112 is illustrated running multiple applications, it is understood that there may be other configurations of application servers that each run one or more applications, where each of the applications generates one or more log files. In various possible configurations of application servers, applications, and log files, the source computing device 102 is configured to collect the log files 114a through 114n for processing prior to transferring the log data information from the log files to the destination computing device 150.

The source computing device 102 includes at least one memory 104, at least one processor 106, and at least one application 108. The source computing device 102 may communicate with one or more other computing devices over a network 110. For instance, the source computing device 102 may communicate with the destination computing device 150 over the network 110. The source computing device 102 may be implemented as a server (e.g., an application server), a desktop computer, a laptop computer, a mobile device such as a tablet device or mobile phone device, as well as other types of computing devices. Although a single source computing device 102 is illustrated, the source computing device 102 may be representative of multiple computing devices in communication with one another, such as multiple servers in communication with one another being utilized to perform its various functions over a network. In some implementations, the source computing device 102 may be representative of multiple virtual machines in communication with one another in a virtual server environment. In some implementations, the source computing device 102 may be representative of one or more mainframe computing devices.

The at least one processor 106 may represent two or more processors on the source computing device 102 executing in parallel and utilizing corresponding instructions stored using the at least one memory 104. The at least one processor 106 may include at least one graphics processing unit (GPU) and/or central processing unit (CPU). The at least one memory 104 represents a non-transitory computer-readable storage medium. Of course, similarly, the at least one memory 104 may represent one or more different types of memory utilized by the source computing device 102. In addition to storing instructions, which allow the at least one processor 106 to implement the application 108 and its various components, the at least one memory 104 may be used to store data, such as signatures and signature identifiers (IDs) generated by the application 108 and the components used by application 108.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the source computing device 102. In other implementations, the application 108 may be running on the source computing device 102 as a component of a cloud network, where a user accesses the application 108 from another computing device over a network, such as the network 110.

In one implementation, the application 108 may be an application configured to collect log files 114a through 114n, read the log data contained in the log files 114a through 114n, and encode the log data prior to transferring the log data to the destination computing device 150, as discussed in more detail below. The application 108 may be a standalone application that runs on the source computing device 102.

Alternatively, the application 108 may be an application that runs in another application such as a browser application. Each source computing device 102 that interacts with an application server 112 or functions as an application server itself, may include the application 108.

The application 108 includes a graphical user interface (GUI) 109. The GUI 109 provides an interface for user interaction with the application 108. The GUI 109 enables user selection and input and also enables an interface for display of results and output from the application 108. Thus, GUI 109 provides for interaction with the user including setting configurable parameters of the application 108, viewing log files and log data, and viewing and interacting with the encoded log data prior to transfer to the destination computing device 150. One example of a configurable parameter that may be set by the user is the threshold amount of match between a string and a signature that is used to determine whether or not the string matches the signature. In some implementations, a default threshold amount of match between a string and a signature may be approximately 80% match. In some implementations, a default threshold amount of match may differ from approximately 80% match. For example, it is understood that a default threshold amount of match may be approximately 85% match, or approximately 75% match, or approximately 90% match, or other approximate default threshold amount of match. In some implementations, a default threshold amount of match may be determined based on experimentation that results in an ideal and/or a target amount of transfer of payload data for application log files. Different applications and motivations may result in setting a different default threshold amount of match. The threshold amount may be changed by a user through a GUI 109.

Application 108 includes a collection agent 120, a reader 122, and an encoder 124. The collection agent 120 collects a log file, such as for example log file 114a, from the application server 112. Example log file 114a includes multiple strings of log data. As used herein, an application log or application log file or log file is a file of events that are logged by a software application. These events are logged out by the software application and written to the application log file. The application log file may contain errors, informational events, warnings, transactional information, and other information. As used herein, a string of log data refers to a line of data or a row of data in an application log file. The reader 122 is configured to read for example, log file 114a and each of the strings of log data in example log file 114a.

Destination computing device 150 includes a decoder 152, data analytics tools 153, at least one memory 154, and at least one processor 156. Decoder 152 is configured to reconstruct a log file in its original format such that no data is lost and a full data set from the log file may be processed by data analytics tools 153. Decoder 152 reads a string from a received message containing the signature identifier (ID) and non-repetitive data. For each received string, decoder 152 uses the signature identifier (ID) in the string to obtain a matching signature from the at least one memory 154. Decoder 152 replaces the text in the signature with a deviation portion from the received string and populates the date into the signature. Decoder 152 repeats this process for each string in the received message, for example, for each string in the log file until the message from the log file is reconstructed at the destination computing device 150. Then, data analytics tools 153 may index and perform one or more data analytics operations on the data.

Figure 2:
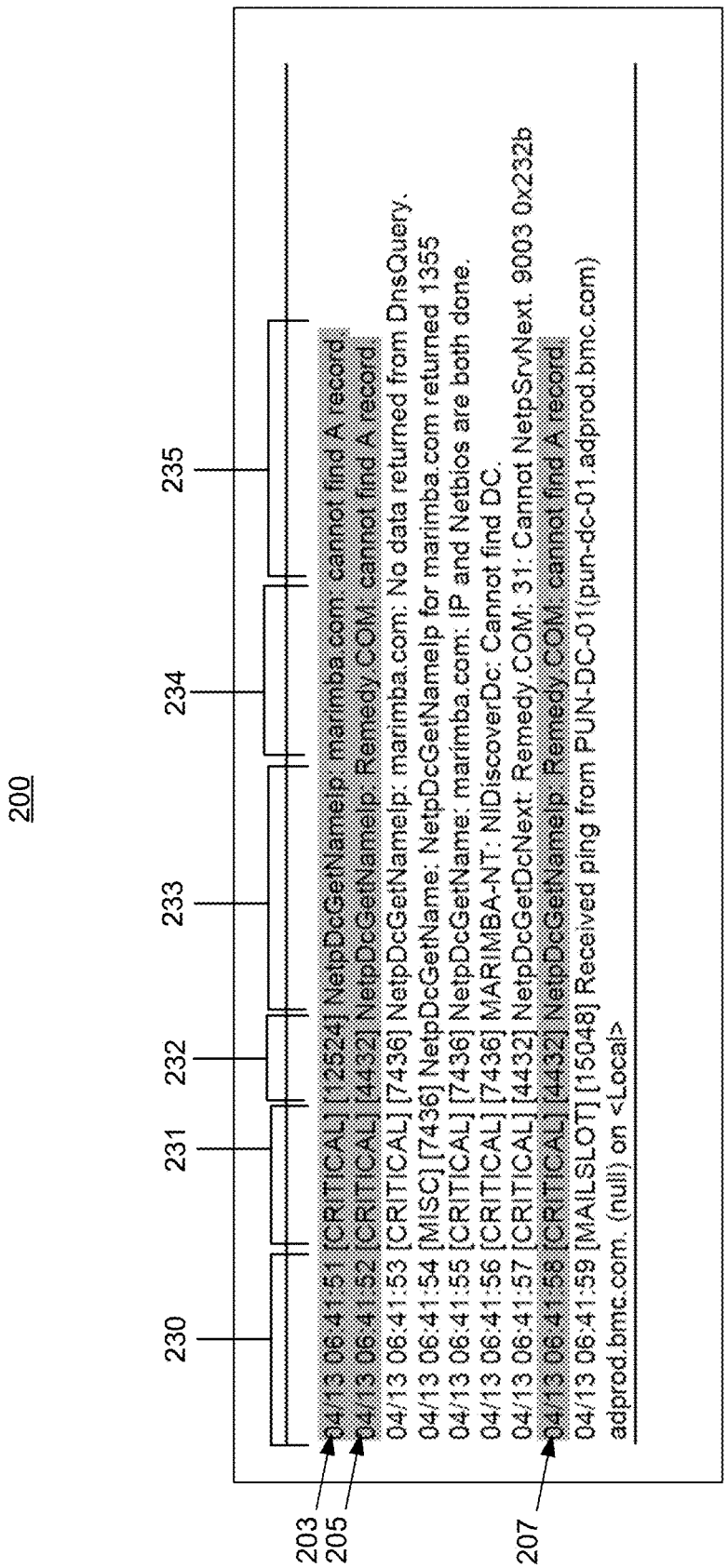
FIG. 2 is an example snippet of log data from a log file.

Referring also to FIG. 2, an example log file 200 is illustrated. The log file 200 includes multiple strings of log data. In this example, the log file 200 is an example from a domain controller log. Each string of data includes multiple positions in the string and multiple words in the string with each word occupying one of the positions. For example, the log file 200 includes a string 203 of log data. Position "0" is shown on FIG. 2 as 230 (which also may be referred to as a location) of the string 203 and is a timestamp. The rest of the string 203 includes position "1" 231, position "2" 232, position "3" 233, position "4" 234, and position "5" 235. Each string of data may include a different number of locations and differing amounts of data. While in this example the timestamp appears in position "0" 230, the timestamp may appear in other positions in the string.

In general, application log files of a continuously running application, including the example log file 200, are repetitive in nature. Thus, there are many redundancies in the log file. The encoder 124 in FIG. 1 is configured to perform a process to reduce the payload size of the log data before it is optionally compressed and then transferred to the destination computing device 150. The encoder 124 determines whether the strings in the log file are repetitive strings by matching the strings against other strings that have been marked as signatures and stored in for example in the at least one memory 104. The signatures are encoded with unique signature identifiers (IDs) and are sent only once to the destination computing device 150. When a string in the log file is compared to the stored signatures, it is determined whether or not the string matches one of the signatures. If a match occurs, the repetitive portion of the string is encoded with the signature identifier (ID) of the matching signature and a deviation from the signature is determined for the non-repetitive portion of the string. In this manner, the whole string is not transferred across the network, but instead only the signature identifier (ID) and the deviation are transferred in the message to the destination computing device 150. In this manner, only the non-repetitive variable portion of the string is transferred to the destination computing device 150 and the repetitive part is replaced with a simple signature identifier (ID). The process, described in more detail below and performed by one or more components of the application 108 and the source computing device 102, illustrates a general overview of the manner in which the non-repetitive and repetitive portions of strings are identified, encoded, and transferred to the destination computing device 150.

Figure 3:
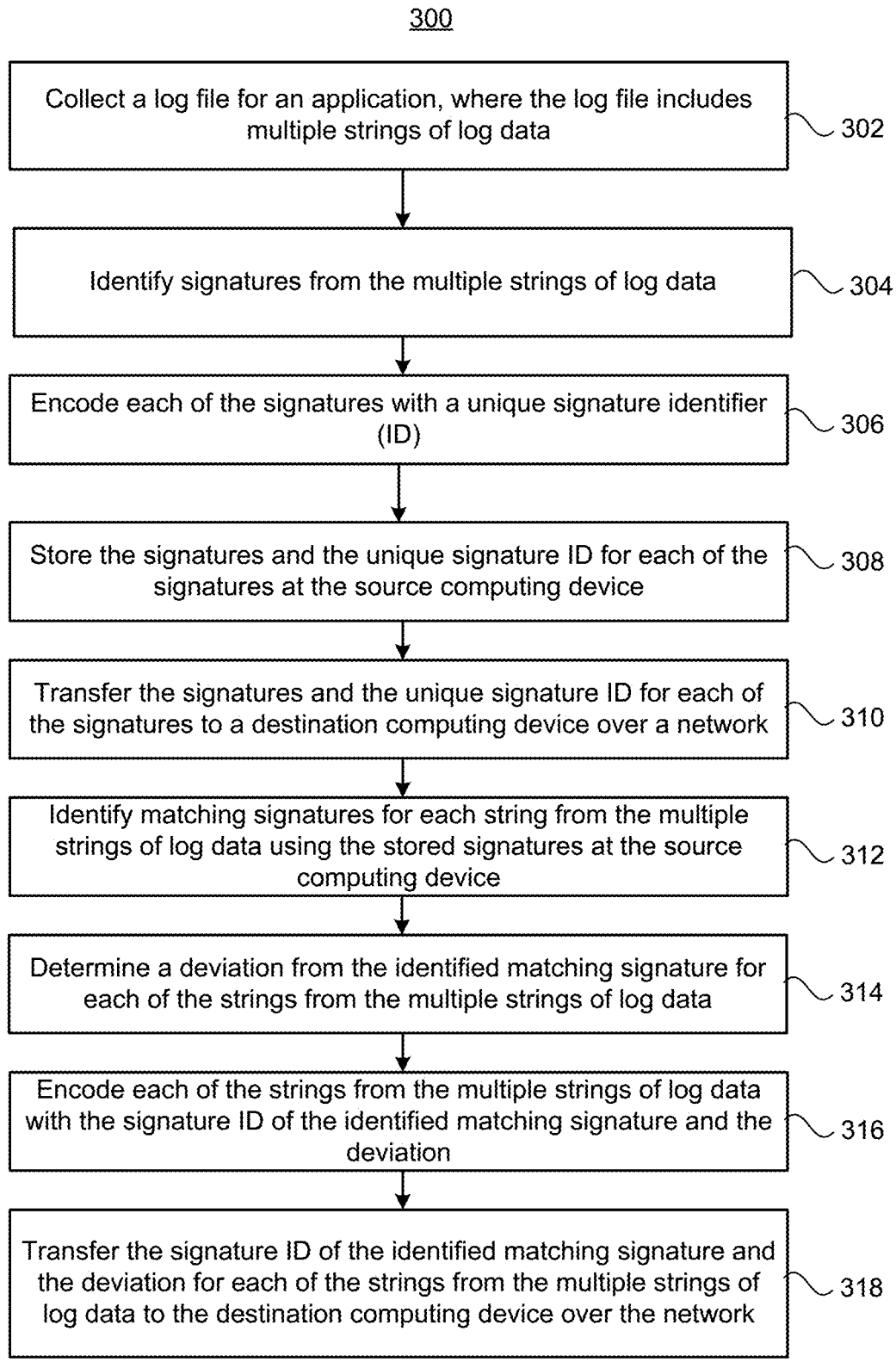
FIG. 3 is a flowchart illustrating example operations of the system of FIG. 1.

Referring also to FIG. 3, an example process 300 illustrates example operations of the system 100 of FIG. 1. More specifically, process 300 illustrates an example of a computer-implemented method to collect and transfer a log file from a source computing device (e.g., source computing device 102 of FIG. 1) to a destination computing device (e.g., destination computing device 150 of FIG. 1). Instructions for the performance of process 300 may be stored in the at least one memory 104 and executed by the at least one processor 106 on the source computing device 102. The instructions for the performance of the process 300 may cause the at least one processor 106 to implement the application 108 and its components.

Process 300 includes collecting a log file for an application, where the log file includes multiple strings of log data (302). For example, the collection agent 120 is configured to collect the log file 114a from the application server 112 one example of which is the log file snippet 200 of FIG. 2. The reader 122 is configured to read each string of the log data.

Process 300 includes identifying signatures from the multiple strings of log data (304). For example, the encoder 124 is configured to identify signatures from the multiple strings of log data. The encoder 124 may take a string in a log file and determine whether or not the string is repetitive by comparing the string to signatures stored in the at least one memory 104. If the string from the log file matches at least a certain percentage of a stored signature, then the string from the log file is considered a repetitive string or at least includes a repetitive portion that is greater than a default threshold amount of match, as described above. If the string from the log file matches less than a threshold percentage of a stored signature, then the string from the log file does not match any previously identified and stored signature and this string is then identified and stored as a signature. In some implementations, the certain percentage to identify the string as repetitive or non-repetitive can be approximately 80%. It is understood that this is just an example and that the percentage of string match to a signature may be configurable, including configurable by a user through the GUI 109.

For example, the encoder 124 compares the string 203 to signatures stored in the at least one memory 104. If the example string 203 matches at least 80% of a stored signature, then the string 203 is considered repetitive or at least includes a repetitive portion and is not identified as a signature because a signature stored in the at least one memory 104 already exists. If the example string 203 does not match the example threshold 80% of a stored signature, then the string 203 is identified as a signature. That is, the string is non-repetitive in the sense that a previously identified signature does not match the string. This process is repeated for each of the strings in an example log file.

In some implementations, the encoder 124 uses for example, a string metric to determine the similarity between a string and stored signatures. A string metric also may be referred to interchangeably as a string similarity metric or a string distance function. A string metric is a metric that measures distance (e.g., inverse similarity) between two text strings for approximate string matching or comparison. In some implementations, a block distance (or L1 distance) is a type of string metric that may be used by encoder 124. In some implementations, other types of string metrics may be used to identify the similarity between a string and stored signatures. An example block distance type of string metric is used to determine a percentage of match between a string from a log file and stored signatures.

Figure 4:
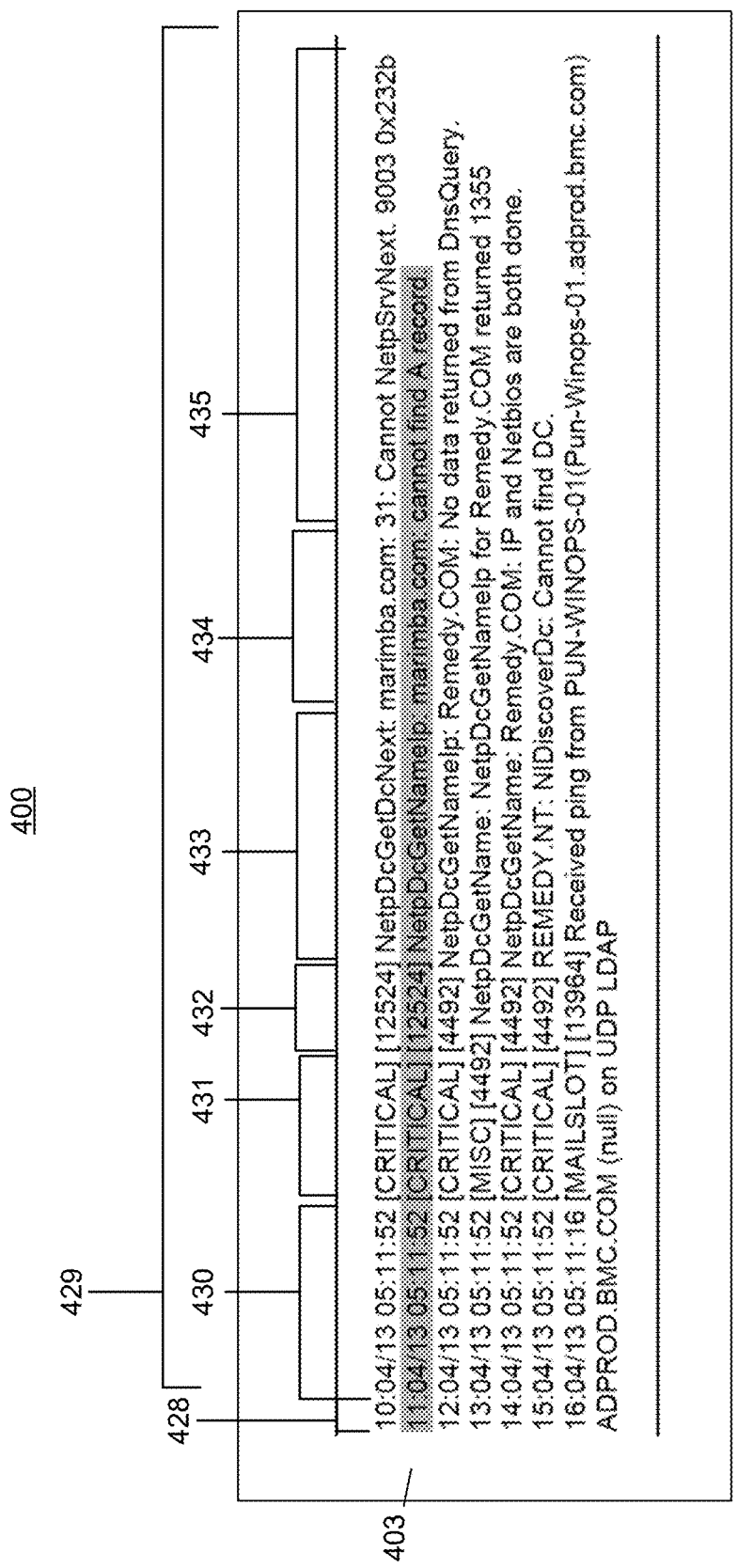
FIG. 4 is an example snippet of the identified signatures from the log data of FIG. 2.

Process 300 includes encoding each of the signatures with a unique signature identifier (ID) (306). For example, the encoder 124 encodes each of the signatures with a unique signature identifier (ID). The unique signature identifier (ID) may be any type of alpha-numeric character. In some implementations, the signature identifier (ID) is a running sequence of numbers. For instance, the encoder 124 encodes the string 203 in FIG. 2 with the signature identifier (ID) of 11, as illustrated FIG. 4. FIG. 4 illustrates the signatures 400 that were identified by the encoder 124 from the log file data 200. The signature string 403 includes the signature identifier (ID) "11", which is the portion before the first colon and the rest of the data after the colon is the signature.

Process 300 includes storing signatures and a unique signature identifier (ID) for each of the signatures at the source computing device 102 (308). For example, encoder 124 stores signatures 400, which includes a signature identifier (ID) portion 428 and a signature 429, in the at least one memory 104. For example, signature identifier (ID portion 430 includes "10", "11", "12", etc., which identifies its corresponding signature 431. Within the signature 429, each word in the signature occupies a position starting with position "0" 430 and continuing on with position "1" 431, position "2" 432, position "3" 433, position "4" 434, and position "5" 435. It is understood that other signatures may include additional positions not illustrated here.

Process 300 also includes transferring signatures and a unique signature identifier (ID) for each of the signatures to a destination computing device over a network (310). For example, in addition to storing signatures and their corresponding signature identifiers (IDs) on a source computing device 102, encoder 124 transfers or communicates the signatures and their corresponding signature identifiers (IDs) to a destination computing device 150 over a network 110. Signatures and signature identifiers (IDs) may be stored in at least one memory 154 on a destination computing device 150. In this manner, destination computing device 150 has a copy of the signatures and of the signature identifiers (IDs) so that destination computing device 150 can reconstruct the original log file. It is noted that signatures and signature identifiers (IDs) are only transferred once over a network 110 to a destination computing device 150. Prior to sending stored signatures and corresponding signature identifiers (IDs) to a destination computing device, an optional compression algorithm may be applied to a signature and the signature identifiers (IDs). The signatures and signature identifiers (IDs) may be transferred to a destination computing device as part of for example, a batch file, which may be optionally compressed.

Process 300 includes identifying matching signatures for each string from the multiple strings of log data using the stored signatures at the source computing device 102 (312). For example, the encoder 124 identifies matching signatures for each string from the multiple strings of log data using the stored signatures at the source computing device 102. The encoder 124 compares each string against the stored signatures in the at least one memory 104. If the string from the log file matches at least a certain percentage of a stored signature, then a match is found. In some implementations, the certain percentage to identify a matching signature for the string is approximately 80%. It is understood that this is just an example and that the percentage of string match to a signature may be configurable, including configurable by a user through the GUI 109.

For example, the encoder 124 compares the string 205 to signatures stored in the at least one memory 104. If the string 205 matches at least 80% of a stored signature, then the signature is a match and the string 205 is considered a repetitive string or at least the string contains a repetitive portion. In this example, the string 205 matches the signature 403 of FIG. 4. This process is repeated for each of the strings in the log file. For example, the string 207 is compared to the signatures stored in the at least one memory 104. The string 207 also matches the signature 403 of FIG. 4. In some implementations, the encoder 124 uses for example a string metric, such as a block distance type string metric, to determine the similarity between a string and the stored signatures. In some implementations, other types of string metrics may be used to identify the similarity between a string and stored signatures.

Process 300 includes determining a deviation from the identified matching signature for each of the strings from the multiple strings of log data (314). For example, the encoder 124 determines a deviation of the identified matching signature for each of the strings of multiple strings of log data. A deviation may be determined, for example, on a word-by-word basis in a string by comparing the word in each position of a string with the word in each position of a signature. For the words that are different, a deviation consists of 1) a position in the string that is different from the corresponding position in a signature, and 2) a word in the position that is different from the portion of a string that is a word. For instance, string 203 is the same as signature 403. That is, words in each position 231 to 235 in string 203 match words in each position 431 to 435 in signature 403, with the only difference being the timestamps in the respective position "0" 230 and 430. Strings 205 and 207 are the same and both differ from the signature 403 with the word in position "2" 232 and the word in position "4" 234. In strings 205 and 207, the word in position "2" 232 is [4432] and the word in position "2" 432 in the signature 403 is [12524]. In strings 205 and 207, the word in position "4" 234 is Remedy.COM and the word in position "4" 434 in the signature 403 is marimba.com. These differences are deviations. The deviation includes a word and the position of the word in a string, which differs from the word in the same position in the signature. The deviation represents the non-repeated portion of a string.

Process 300 includes encoding each of the strings from the multiple strings of log data with the signature identifier (ID) of the identified matching signature and the deviation (316). For example, the encoder 124 encodes each of the strings from the multiple strings of log data with the signature identifier (ID) of the identified matching signature and the deviation, which represents the difference between strings with respect to position and the word in the position.

Figure 5:
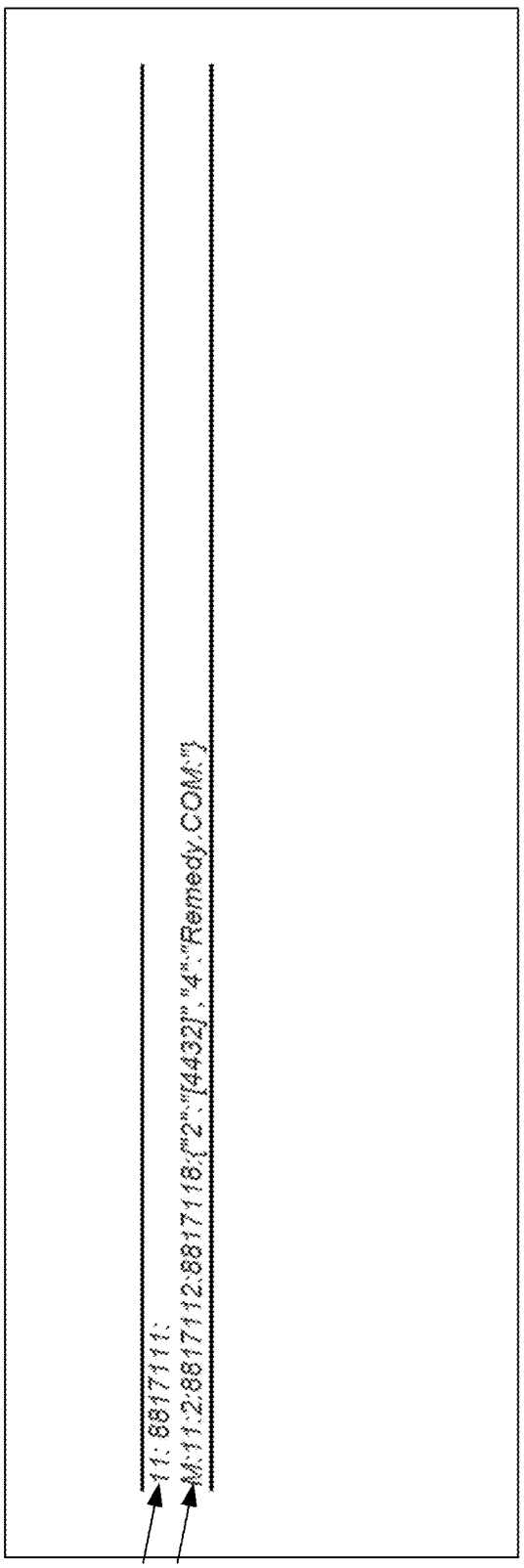
FIG. 5 is an example snippet of an encoded repetitive string from the log data of FIG. 2.

Referring to FIG. 5, the code snippet 500 illustrates the encoded strings 203, 205, and 207. The string 501 is the repetitive string 203 that matches the signature 403 identically except for the timestamp. The string 501 is encoded with the signature identifier (ID) of "11" and the timestamp in for example, Epoch Converter format, for string 203. There is no deviation to encode for string 203 since the match is identical to the signature 403 because the timestamp in position "0" 230 and 430 is handled separate from the deviation.

Figure 6:
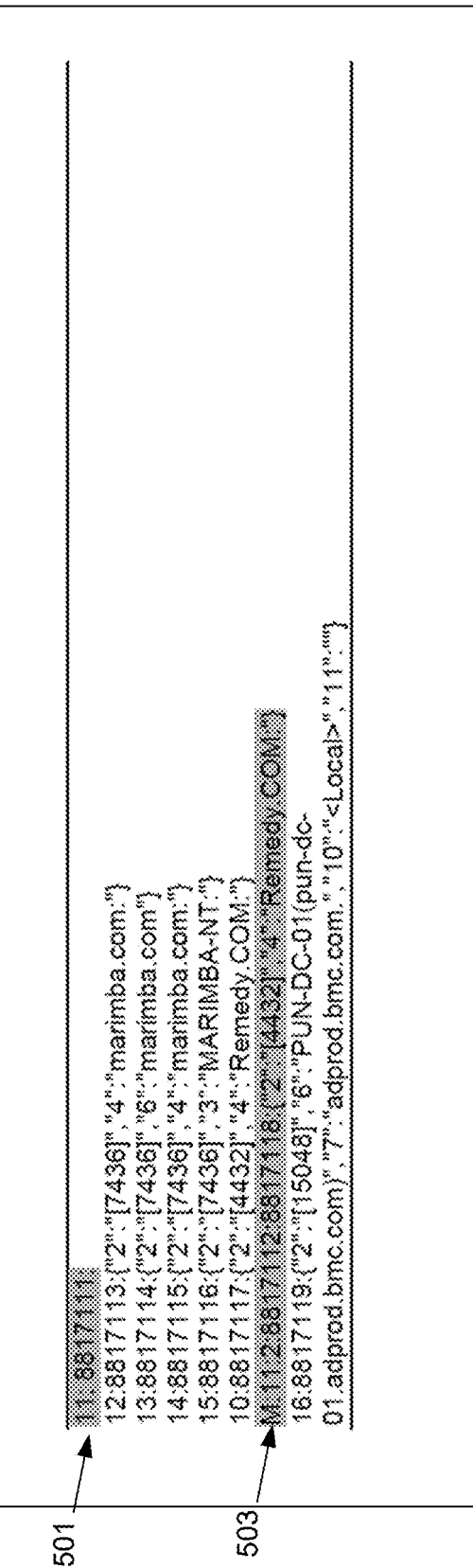
FIG. 6 is an example snippet of the complete encoded data from the log data of FIG. 2.

For the strings 205 and 207, string 503 is encoded as follows. The first character in string 503 "M" indicates that there are multiple messages with the same deviation, but different timestamp. The "11" is the signature identifier (ID) for the identified matching signature 403. The next character "2" indicates the count of the number of matching messages. The next set of characters "8817112" and "8817118" are the timestamps in Epoch Converter format for the strings 205 and 207, respectively. The next part of the encoded string 503 indicates the position or location of the word that differs from the signature 403 and the different word. The deviation is coded as {"2":"[4432]","4":"Remedy.COM:"}. Instead of having to repeat the strings 205 and 207 in their entirety, the encoded string 503 uses the signature identifier (ID) of the matching signature, which is just 2 characters, the timestamps of the strings, and the deviation, which is the different words and their positions in the string. Referring to FIG. 6, the code snippet 600 illustrates the encoded message for the log file 200 of FIG. 2.

Process 300 then includes transferring the signature identifier (ID) of the identified matching signature and the deviation for each of the strings from the multiple strings of log data to the destination computing device over the network (318). For example, the encoder 124 transfers the signature identifier (ID) of the identified matching signature and the deviation for each of the strings from the multiple strings of log data to the destination computing device 150.

In some example implementations, the encoder 124 sends the messages in a batch file as part of one send request and may send multiple batch files in different send requests. In some implementations, the encoder 124 may optionally compress the strings prior to transferring them to the destination computing device 150. For example, the encoder 124 may use compression techniques such as deflate compression and dictionary-based compression.

The destination computing device 150 includes a decoder 152, data analytics tools 153, at least one memory 154, and at least one processor 156. The decoder 152 is configured to reconstruct the log file in its original format such that no data is lost and the full data set from the log file may be processed by the data analytics tools 153. The decoder 152 reads a string from the received message containing the signature identifier (ID) and non-repetitive data. For each received string, the decoder 152 uses the signature identifier (ID) in the string to obtain the matching signature from the at least one memory 154. The decoder 152 replaces the text in the signature with the deviation portion from the received string and populates the date into the signature. The decoder 152 repeats this process for each string in the received message, for example, for each string in the snippet 600 of FIG. 6 until the message from the log file 200 is reconstructed at the destination computing device 150. Then, the data analytics tools 153 may index and perform one or more data analytics operations on the data.

Figure 7:
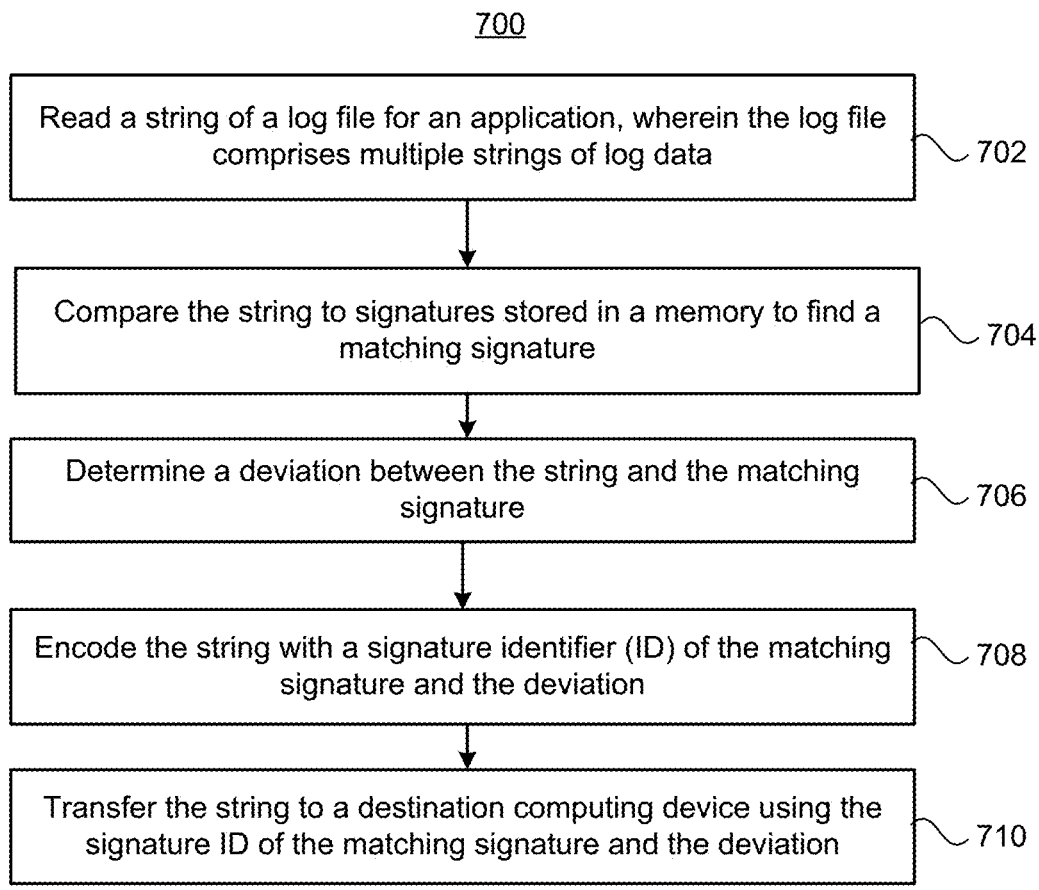
FIG. 7 is a flowchart illustrating example operations of the system of FIG. 1.

FIG. 7 for process 700 illustrates an example of a computer-implemented method to encode and transfer a log file from a source computing device (e.g., source computing device 102 of FIG. 1) to a destination computing device (e.g., destination computing device 150 of FIG. 1). Instructions for the performance of process 700 may be stored in at least one memory 104 of a source computing device 102 and executed by the at least one processor 106 on the source computing device 102. The instructions for the performance of the process 700 may cause the at least one processor 106 to implement the application 108 and its components.

Process 700 includes reading a string of a log file for an application, wherein the log file comprises multiple strings of log data (702). For example, the reader 122 of FIG. 1 reads a string of a log file (e.g., log file 114a), where the log file 114a includes multiple strings of log data. The string is compared to signatures stored in a memory to find a matching signature (704). For example, the encoder 124 compares the string to the signatures stored in the memory 104 to find a matching signature, where each of the signatures is encoded with a signature identifier (ID). When the string does not match any of the signatures, the string is stored as a new signature in the memory 104, and the new signature is assigned a new signature identifier (ID). In some implementations, the encoder 124 uses for example a string metric, such as a block distance type string metric to compare the string to the signatures stored in the memory 104.

A deviation is determined between the string and the matching signature (706). For example, the encoder 124 determines a deviation between a string and a matching signature. As discussed above, a string includes multiple words and a position for each of multiple words. A deviation is based on differences between words in a matching signature and a string by using a position for each of the words. If a word in a position in a string does not match a word in the same position in a matching signature, then the word is part of the deviation. If a word in a position in the string does match a word in the same position in a matching signature, then the word is not part of the deviation.

The string is encoded with a signature identifier (ID) of the matching signature and deviation (708). For example, encoder 124 is configured to encode a string with a signature identifier (ID) of a matching signature and a deviation. The string is transferred to a destination computing device using the signature identifier (ID) of the matching signature and deviation (710). In some implementations, the string is transferred in a batch file together with other strings into a payload message prior to the transfer of the string to the destination computing device. In some implementations, the payload message is optionally compressed prior to transfer to the destination computing device, using for example, deflate compression or dictionary-based compression.

Figure 8:
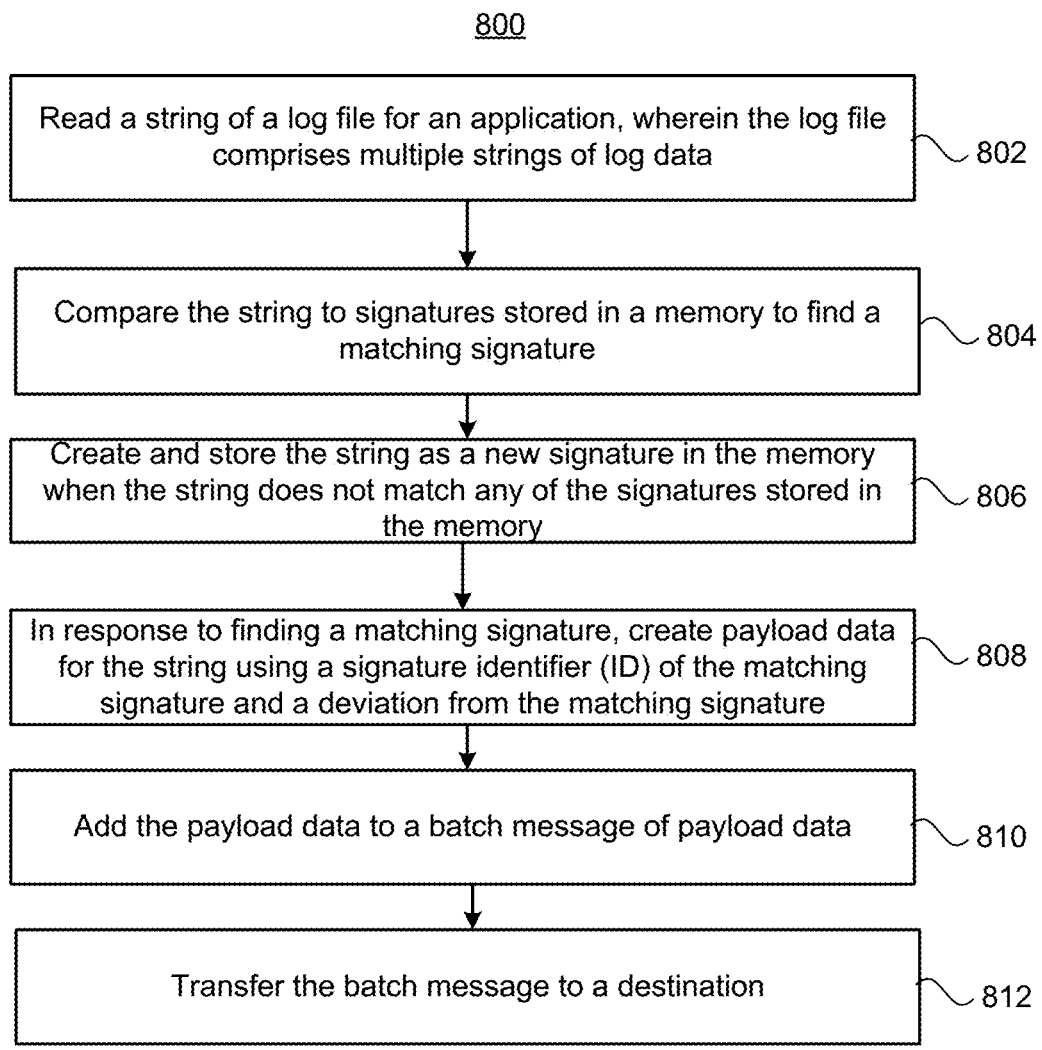
FIG. 8 is a flowchart illustrating example operations of the system of FIG. 1.

FIG. 8 illustrates a process 800 illustrates an example of a computer-implemented method to encode and transfer a log file from a source computing device (e.g., source computing device 102 of FIG. 1) to a destination computing device (e.g., destination computing device 150 of FIG. 1) in a batch file mode. Instructions for the performance of process 800 may be stored in at least one memory 104 and executed by the at least one processor 106 on the source computing device 102. The instructions for the performance of the process 800 may cause the at least one processor 106 to implement the application 108 and its components.

Process 800 includes reading a string of a log file for an application, wherein the log file includes multiple strings of log data (802). For example, the reader 122 of FIG. 1 reads a string of a log file (e.g., log file 114a), where the log file 114a includes multiple strings of log data. The string is compared to signatures stored in a memory to find a matching signature (804). For example, the encoder 124 compares the string to the signatures stored in the memory 104 to find a matching signature, where each of the signatures is encoded with a signature identifier (ID). In some implementations, the encoder 124 uses for example a string metric, such as a block distance type string metric to compare the string to the signatures stored in the memory 104.

The string is created and stored as a new signature in the memory when the string does not match any of the signatures stored in the memory (806). In response to finding a matching signature, payload data for the string is created using a signature identifier (ID) of the matching signature and a deviation from the matching signature (808). For example, the encoder 124 determines the deviation between the string and the matching signature. As discussed above, the string includes multiple words and a position for each of the multiple words. The deviation is based on the differences between words in the matching signature and the string by using the position for each of the words. If the word in a position in the string does not match the word in the same position in the matching signature, then the word is part of the deviation. If the word in the position in the string does match the word in the same position in the matching signature, then the word is not part of the deviation. The payload data is added to a batch message of payload data (810). The batch message is transferred to a destination (812).

FIGS. 9-14 illustrate different examples of a string from a log file along with a matching signature. The examples illustrate the identification of the deviation between the string and the matching signature. In each of the examples, the first string is considered as the signature (or seed). The signature may be stored on the source computing device 102 in memory and is transferred to the destination computing device 150 along with other signatures stored on the source computing device 102 so that the log file can be reconstructed on the destination computing device 150. In some implementations, all of the data may be compressed before being transferred to the destination computing device 150. The destination computing device 150 may decompress the data before reconstructing the data.

Figure 9:
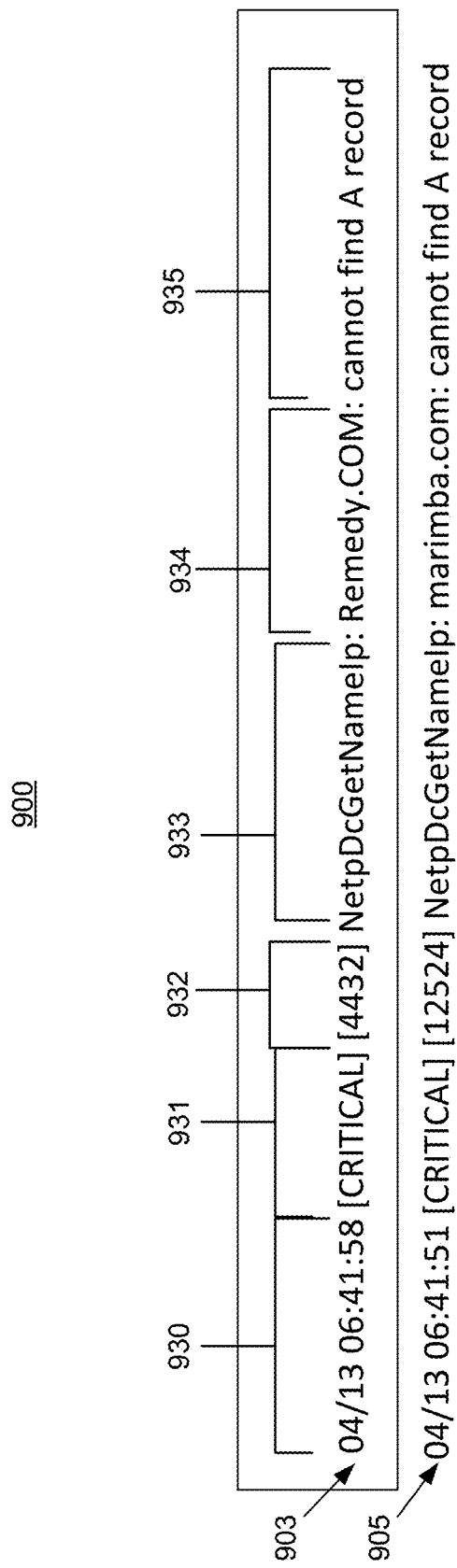
FIG. 9 are example snippets of data from a log file that are sent to a destination computing device and reconstructed at the destination computing device.

Referring to FIG. 9, this example illustrates an example snippet 900 from a log file where a string 903 from a log file and a signature 905 have the same length and a deviation in two positions of the string. String 903 found in the log file includes a timestamp in position "0" 930 "04/13 06:41:58" and five additional words in string in position "1" 931 to position "5" 935: [CRITICAL] [4432] NetpDcGetNamelp: Remedy.COM: cannot find A record". String 903 matches signature 905 with the exception of a timestamp in position "0" 930 and two words in the data in position "2" 932 and position "4" 934. Specifically, string 903 includes [0043] in position "2" 932 and the signature 905 has [12524] in position "2" 932. Also, string 903 has "Remedy.com" in position "4" 934 and the signature has "marimba.com" in position "4" 934. While not illustrated, signature 905 has a signature identifier (ID) of "11". Thus, the data to be sent from the source computing device to the destination computing device for string 903 includes the signature identifier (ID) for matching signature 905, a timestamp for string 903, and a deviation, which consists of the positions of the words that differ between string 903 and signature 905 along with the words from string 903 in those positions. Here, the data to be sent is:

11:8817118:{2=[4432], 4=Remedy.COM:}

When a destination computing device receives data representing string 903, the destination computing device reconstructs string 903 into its full form by converting the timestamp back to date/time format, replacing signature identifier (ID) "11" with signature 905, replacing position "2" 932 word [12524] in signature 905 with position "2" 932 word [4432] from string 903, and replacing position "4" 934 word "marimba.com" in signature 905 with position "4" word 934 "Remedy.COM" from string 903. The final reconstructed string is: "04/13 06:41:58 [CRITICAL] [4432] NetpDcGetNamelp: Remedy.COM: cannot find A record," which matches string 903 from the log file.

Figure 10:
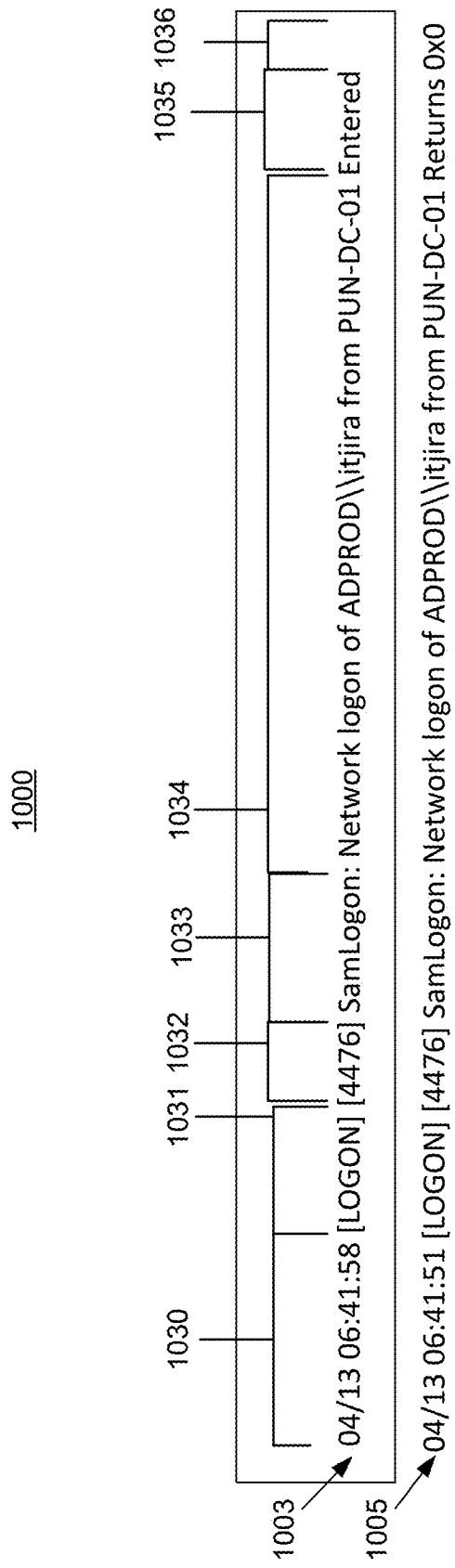
FIG. 10 are example snippets of data from a log file that are sent to a destination computing device and reconstructed at the destination computing device.

Referring to FIG. 10, this example illustrates an example snippet 1000 from a log file where string 1003 from the log file and signature 1005 have differing lengths. Specifically, string 1003 is shorter than signature 1005 by one position, position "6" 1036. String 1003 found in the log file includes a timestamp in position "0" 1003 "04/13 06:41:58" and five additional words in the string in position "1" 1031 to position "5" 1035. String 1003 matches signature 1005 with the exception of a timestamp in position "0" 1030, a word in position "5" 1035, and no word in position "6" 1036. Specifically, string 1003 includes "Entered" in position "5" 1035, and signature 1005 has "Returns" in position "5" 1035. Signature 1005 includes "0x0" in position "6" 1036, and string 1003 does not have a word in that position. While not illustrated, signature 1005 has a signature identifier (ID) of "11". Thus, the data to be sent from a source computing device to a destination computing device for string 1003 includes a signature identifier (ID) for matching signature 1005, a timestamp for the string 1003, and a deviation, which consists of the positions of the words that differs between string 1003 and signature 1005, along with the words from string 1003 in those positions. Here, the data to be sent is:

11:8817118:{5=Entered, 6=}

When the destination computing device receives data representing string 1003, the destination computing device reconstructs string 1003 into its full form by converting a timestamp back to date/time format, replacing signature identifier (ID) "11" with signature 1005, replacing position "5" 935 word "Returns" in signature 1005 with position "5" 1032 word "Entered" from string 1003, and removing position "6" 1036 word "0x0" in signature 1005. The final reconstructed string is: "04/13 06:41:58 [LOGON] [4476] SamLogon: Network logon of ADPROD\\itjira from PUN-DC-01 Entered"

Figure 11:
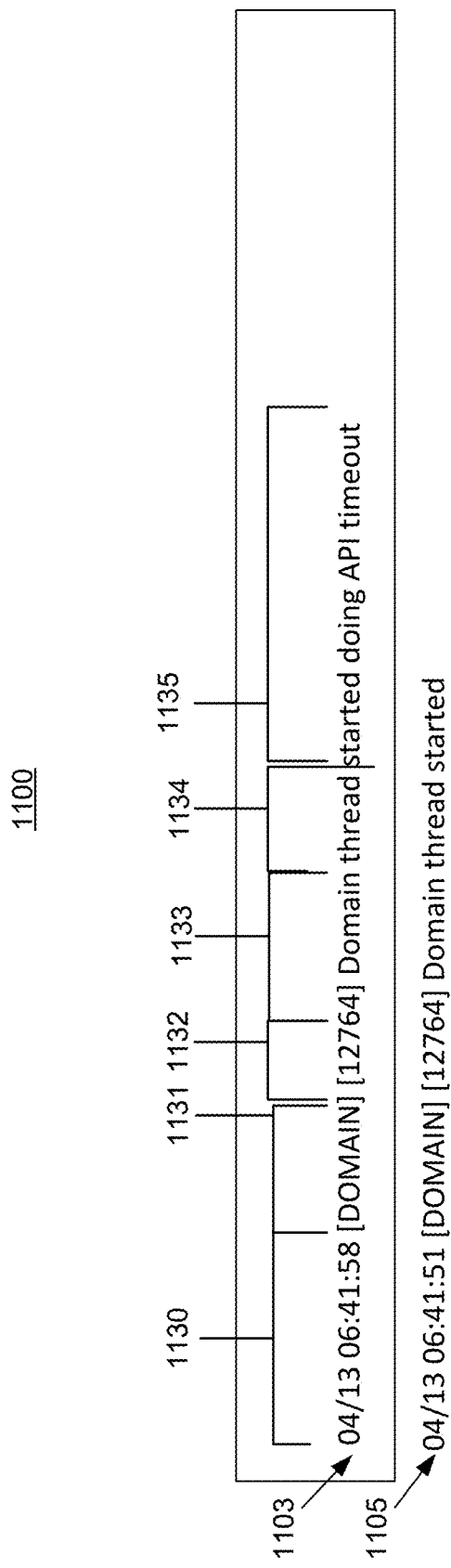
FIG. 11 are example snippets of data from a log file that are sent to a destination computing device and reconstructed at the destination computing device.

Referring to FIG. 11, this example illustrates an example snippet 1100 where signature 1105 is shorter than string 1103. That is, string 1103 includes additional words not present in signature 1105. String 1103 found in the log file includes a timestamp in position "0" 1130 "04/13 06:41:58" and additional words in position "1" 1131 to position "5" 1135: "[DOMAIN] [12764] Domain thread started doing API timeout". String 1103 matches signature 1105 with the exception of a timestamp in position "0" 1130 and the additional words starting in position "5" 1135 of the string 1103, where string 1103 is longer than signature 1105. The words in string 1103 located at position 5 are different than the words in signature 1105 and there are multiple words in it. In this situation, additional words in the string 1103 in position "5" 1135 are appended to the previous word and the previous word's location is used.

Thus, the data to be sent from a source computing device to a destination computing device for string 1103 includes a signature identifier (ID) for the matching signature 1105, which in this example is "12", a timestamp for string 1103, and a deviation, which consists of additional words in position "5" 1135 that are not present in signature 1105. Here the data to be sent is:

12:8817118:{5=started doing API timeout}

When a destination computing device receives data representing string 1103, the destination computing device reconstructs string 1103 into its full form by converting its timestamp back to date/time format, replacing a signature identifier (ID) "12" with signature 1105 and appending additional words "started doing API timeout" to the last word in position "5" 1135 of signature 1105. The final reconstructed string is: "04/13 06:41:58 [DOMAIN] [12764] Domain thread started doing API timeout," which matches string 1103 from the log file.

Figure 12:
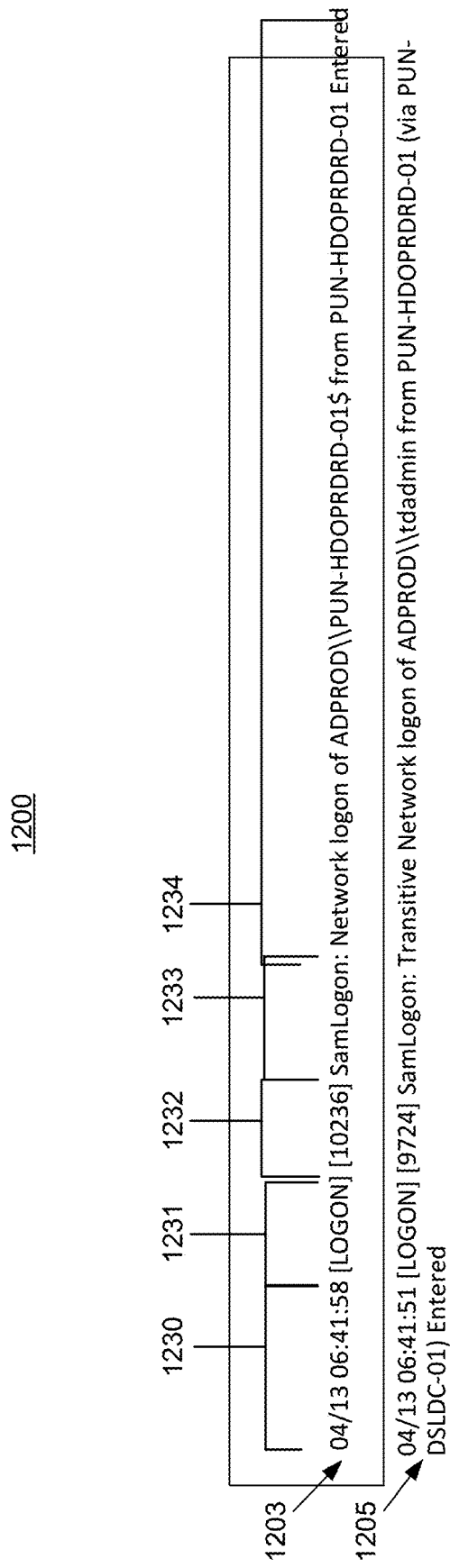
FIG. 12 are example snippets of data from a log file that are sent to a destination computing device and reconstructed at the destination computing device.

Referring to FIG. 12, this example illustrates an example snippet 1200 where string 1203 from the log file and signature 1205 have multiple different words in the middle of string 1203 when compared to signature 1205. The string 1203 includes a timestamp in position "0" 1230 "04/13 06:41:58" and additional words in position "1" 1231 through position "4" 1234 with position "4" representing multiple positions and multiple words: "[LOGON] [10236] SamLogon: Network logon of ADPROD\\PUN-HDOPRDRD-01$ from PUN-HDOPRDRD-01 Entered." In some implementations, each word in position "4" may be a separate position for each word. String 1203 matches signature 1205 with the differences being a timestamp in position "0" 1230, a different word in position "2" 1232 "[10236]", the word "Transitive" is not present in string 1203, and words in position "4" 1234 are different or are not present in string 1203 when compared to signature 1205. Thus, the data to be sent from a source computing device to a destination computing device for string 1203 includes a signature identifier (ID) for matching signature 1205, which in this example is "14". The actual data sent is: "14:8817118:{2=[10236], 4=, 8=ADPROD\PUN-HDOPRDRD-01$, 11=, 12=}"

When a destination computing device receives data representing string 1203, destination computing device reconstructs string 1203 into its full form by converting its timestamp back to date/time format, replacing signature identifier (ID) "14" with the signature 1205, and replacing the positions and words identified by the deviation in signature 1205 so that the fully reconstructed string 1203 is: "04/13 06:41:58 [LOGON] [10236] SamLogon: Network logon of ADPROD\\PUN-HDOPRDRD-01$ from PUN-HDOPRDRD-01 Entered"

Figure 13:
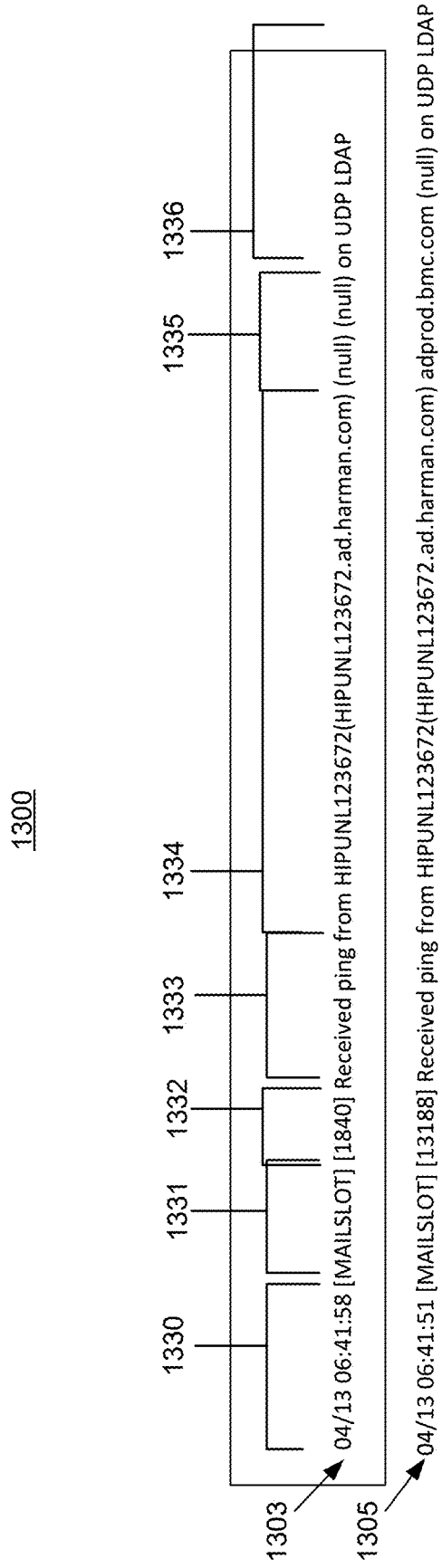
FIG. 13 are example snippets of data from a log file that are sent to a destination computing device and reconstructed at the destination computing device.

Referring to FIG. 13, this example illustrates an example snippet 1300 from a log file wherein string 1303 from a log file includes repetitive words in the middle, which are not found in matching signature 1305. Similar to the examples above, string 1303 includes position 1330 to 1335, where some of the positions may include multiple words and/or represent multiple positions, each with a word in the position. Here, string 1303 has "[1840]," which is located at position "2" 1332, and the word at position 1335 includes "(null) (null)," which is repetitive. The actual data sent from the source computing device to the destination computing device is: "14:8817118:{2=[1840], 7=, 8=(null) (null)}".

A destination computing device fully reconstructs string 1303 by replacing position "2" 1332 in signature 14 "[13188]" with "[1840]", the word at position 7 'adprod.bmc.com' is cleared, and the word at position 8 '(null)' is replaced with '(null) (null)'. This results in a string 1303 of: "04/13 06:41:58 [MAILSLOT] [1840] Received ping from HIPUNL123672 (HIPUNL123672.ad.harman.com) (null) (null) on UDP LDAP"

Figure 14:
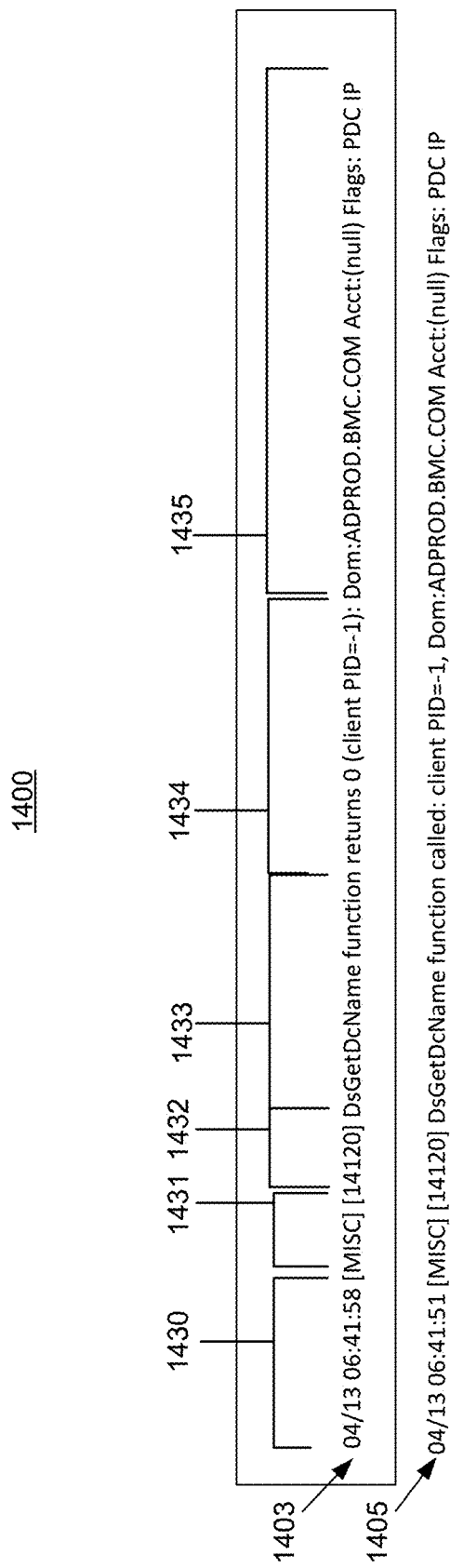
FIG. 14 are example snippets of data from a log file that are sent to a destination computing device and reconstructed at the destination computing device.

Referring to FIG. 14, this example illustrates an example snippet 1400 from a log file where string 1403 includes multiple words in the middle of string 1403, which differ from matching signature 1405. Similar to the examples above, string 1403 includes position 1430 to 1435, where some of the positions may include multiple words and/or represent multiple positions, each with a word in the position. The actual data sent from the source computing device to the destination computing device is: "13:8817118:{5=returns, 6=0, 7=(client PID=−1):}"Here the signature identifier (ID) is 13 for signature 1405.

A destination computing device reconstructs the full string 1403 by replacing position 5 word in signature 13 'called:' with 'returns', word at position 6 'client' with 0, and word at position 7 'PID=−1,' with '(client PID=−1):' with final string 1403 being: "04/13 06:41:58 [MISC] [14120] DsGetDcName function returns 0 (client PID=−1): Dom:ADPROD.BMC.COM Acct:(null) Flags: PDC IP".

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer readable medium comprising instructions that, when executed by at least one processor, cause a computing device to:
 read a string of a log file of an application, wherein the log file comprises multiple strings of log data;
 compare the string to signatures stored in a memory to find a matching signature, wherein each of the signatures is encoded with a signature identifier (ID);
 determine a deviation between the string and the matching signature;
 encode the string with the signature identifier (ID) of the matching signature and the deviation; and
 transfer the encoded string to a destination computing device using the signature identifier (ID) of the matching signature, the deviation, and a timestamp of the string.

2. The non-transitory computer readable medium of claim 1, further comprising instructions that, when executed by the at least one processor, cause the computing device to:
 create and store a new signature in the memory when the string does not match any of the signatures stored in the memory; and
 assign a new signature identifier (ID) to the new signature.

3. The non-transitory computer readable medium of claim 1, further comprising instructions that, when executed by the at least one processor, cause the computing device to:
 batch the encoded string with other encoded strings into a payload message prior to transferring the encoded string to the destination computing device.

4. The non-transitory computer readable medium of claim 3, further comprising instructions that, when executed by the at least one processor, cause the computing device to:

compress the payload message prior to transferring the encoded string to the destination computing device.

5. The non-transitory computer readable medium of claim 1, wherein the instructions that, when executed by the at least one processor, cause the computing device to compare the string to the signatures stored in the memory comprise instructions that, when executed by the at least one processor, cause the computing device to compare the string to the signatures stored in the memory using a string metric to find the matching signature.

6. The non-transitory computer readable medium of claim 1, wherein:
the string comprises multiple words and a position for each of the multiple words; and
the deviation between the string and the matching signature is based on differences between words in the matching signature and the string using the position for each of the multiple words.

7. The non-transitory computer readable medium of claim 1, further comprising instructions that, when executed by the at least one processor, cause the computing device to:
transfer the signatures stored in the memory to the destination computing device.

8. The non-transitory computer readable medium of claim 1, further comprising instructions that, when executed by the at least one processor, cause the computing device to:
reconstruct the string at the destination computing device.

9. A non-transitory computer readable medium comprising instructions that, when executed by at least one processor, cause a computing device to:
read a string of a log file for an application, wherein the log file comprises multiple strings of log data;
compare the string to signatures stored in a memory to find a matching signature, wherein each of the signatures is encoded with a signature identifier (ID);
create and store the string as a new signature in the memory when the string does not match any of the signatures stored in the memory;
in response to finding a matching signature, create payload data for the string using the signature identifier (ID) of the matching signature and a deviation from the matching signature;
add the payload data to a batch message of payload data; and
transfer the batch message to a destination computing device.

10. The non-transitory computer readable medium of claim 9, further comprising instructions that, when executed by the at least one processor, cause the computing device to:
compress the payload data prior to transferring the batch message to the destination computing device.

11. The non-transitory computer readable medium of claim 9, wherein the instructions that, when executed by the at least one processor, cause the computing device to compare the string to the signatures stored in the memory comprise instructions that, when executed by the at least one processor, cause the computing device to compare the string to the signatures stored in the memory using a string metric to find the matching signature.

12. The non-transitory computer readable medium of claim 9, wherein:
the string comprises multiple words and a position for each of the multiple words; and
the deviation between the string and the matching signature is based on differences between words in the matching signature and the string using the position for each of the multiple words.

13. The non-transitory computer readable medium of claim 9, further comprising instructions that, when executed by the at least one processor, cause the computing device to:
transfer the signatures stored in the memory to the destination computing device.

14. The non-transitory computer readable medium of claim 13, further comprising instructions that, when executed by the at least one processor, cause the computing device to:
reconstruct the string at the destination computing device.

15. A computer-implemented method for transferring log data over a network, the computer-implemented method comprising:
collecting, by a source computing device, a log file for an application, wherein the log file includes multiple strings of log data;
identifying, signatures from the multiple strings of log data;
encoding, each of the signatures with a unique signature identifier (ID);
storing the signatures and the unique signature identifier (ID) for each of the signatures;
transferring the signatures and the unique signature identifier (ID) for each of the signatures to a destination computing device;
identifying, matching signatures for each string from the multiple strings of log data using the stored signatures;
determining a deviation from the identified matching signature for each of the strings from the multiple strings of log data;
encoding, each of the strings from the multiple strings of log data with the unique signature identifier (ID) of the identified matching signature and the deviation; and
transferring the encoded strings including the unique signature identifier (ID) of the identified matching signature and the deviation for each of the strings from the multiple strings of log data over the network.

16. The computer-implemented method as in claim 15, further comprising:
prior to transferring the encoded strings from the multiple strings of log data to the destination computing device over the network, compressing the signature identifier (ID) of the identified matching signature and the deviation for each of the strings from the multiple strings of log data.

17. The computer-implemented method as in claim 15, further comprising:
reconstructing, by the destination computing device, the log file using the signatures for the strings from the multiple strings of log data and the signature identifier (ID) of the identified matching signature and the deviation for each of the strings from the multiple strings of log data.

18. The computer-implemented method as in claim 15, wherein identifying, by the source computing device, the matching signatures for each of the strings from the multiple strings of log data comprises comparing each of the strings against the stored signatures at the source computing device using a string metric.

19. The computer-implemented method as in claim 15, wherein:
each of the strings from the multiple strings of log data comprises multiple words and a position for each of the multiple words; and
the deviation from the identified matching signature for each of the strings from the multiple strings of log data is based on differences between words in the identified matching signature and the string using the position for each of the multiple words.

20. The computer-implemented method as in claim 15, wherein transferring the encoded strings including the signature identifier (ID) of the identified matching signature and the deviation for each of the strings from the multiple strings of log data comprises transferring the encoded strings including a timestamp, the signature identifier (ID) of the identified matching signature, and the deviation for each of the encoded strings from the multiple strings of log data to the destination computing device over the network.

21. The computer-implemented method as in claim 15, wherein:
- the log file collected by the source computing device is a first size;
- the signature identifier (ID) of the identified matching signature and the deviation for each of the strings from the multiple strings of log data to the destination computing device over the network is a second size; and
- the first size is larger than the second size.

* * * * *